United States Patent [19]

Hughes

[11] 4,319,628
[45] Mar. 16, 1982

[54] TWO LIQUID HEAT EXCHANGE SYSTEM AND SAFETY VALVE TO PREVENT CONTAMINATION

[75] Inventor: R. Lyle Hughes, Covina, Calif.
[73] Assignee: Southern California Gas Company, Los Angeles, Calif.
[21] Appl. No.: 57,271
[22] Filed: Jul. 13, 1979
[51] Int. Cl.³ .............................................. G05D 23/00
[52] U.S. Cl. ...................................... 165/39; 165/70; 165/71; 165/134 R; 137/87
[58] Field of Search ................. 165/70, 71, 32, 134 R, 165/39, 38; 137/87; 251/61.3

[56] References Cited

U.S. PATENT DOCUMENTS

| | | | |
|---|---|---|---|
| 2,581,429 | 1/1952 | Meyer . | |
| 2,878,830 | 3/1959 | Wiedmann | 137/599 |
| 3,817,264 | 6/1974 | Kilayko | 251/61.3 X |
| 3,893,591 | 7/1975 | Hockmuth et al. | 137/87 X |
| 3,926,204 | 12/1975 | Earl | 137/116.5 |
| 4,111,223 | 9/1978 | Gelnett | 137/115 |
| 4,202,406 | 5/1980 | Avery | 165/71 X |

Primary Examiner—Albert W. Davis
Assistant Examiner—Margaret A. Focarino
Attorney, Agent, or Firm—Donald D. Mon

[57] ABSTRACT

A two liquid heat exchange system, and a safety valve to prevent contamination of one liquid (first liquid) by the other. In systems such as hydronic solar systems, it is customary for a first liquid to be heated and run through a heat exchanger where its heat is transferred to a second liquid, often in a storage tank. This invention provides a safety valve which dumps the first liquid in case the pressure of the second liquid does not exceed the pressure of the first liquid by at least a predetermined difference.

8 Claims, 6 Drawing Figures

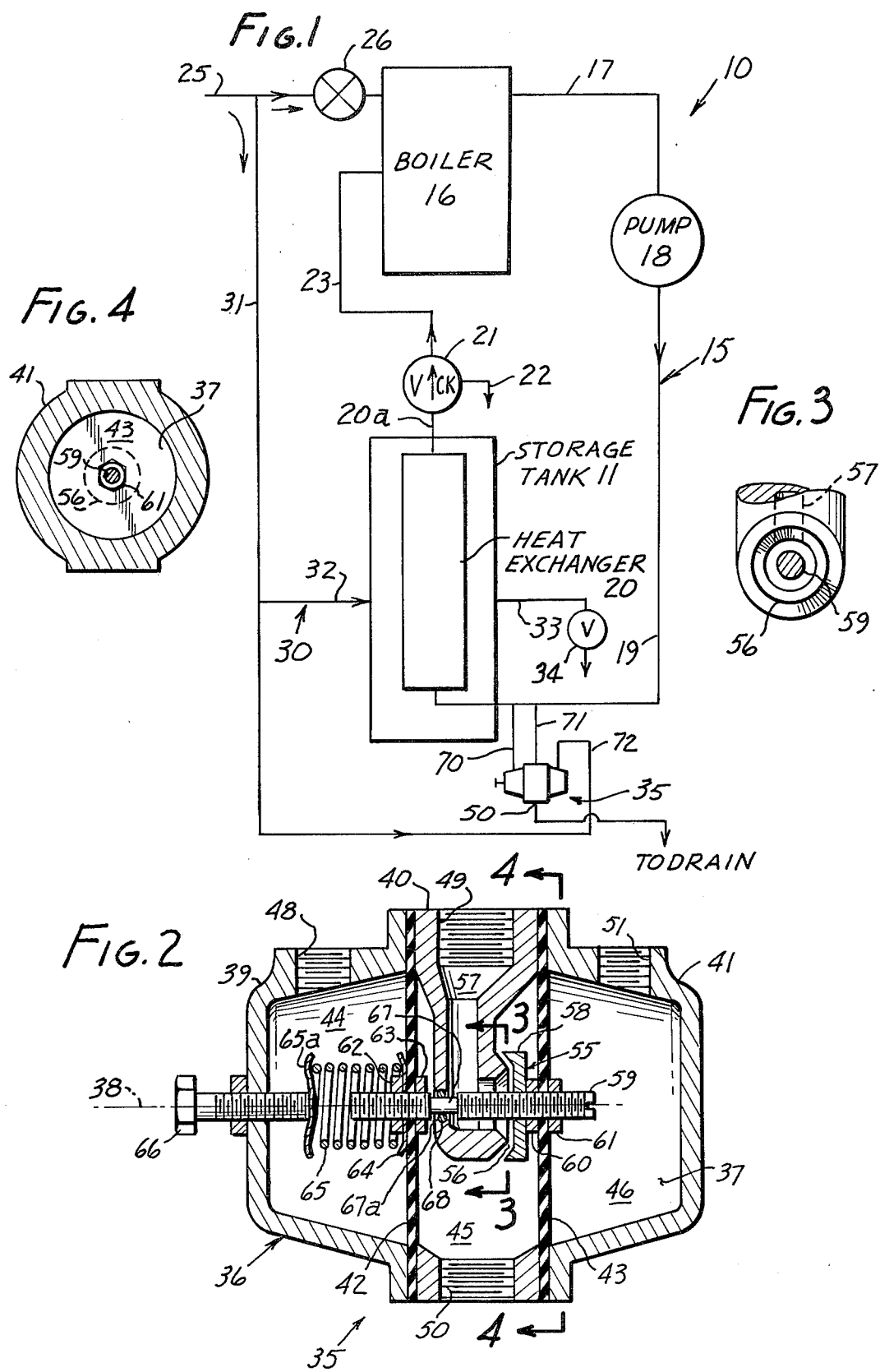

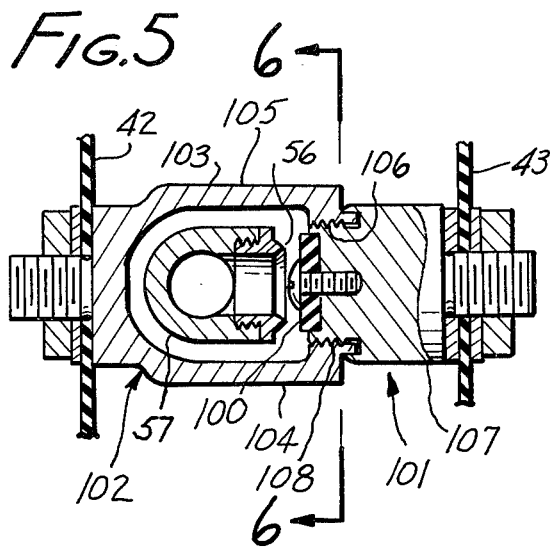
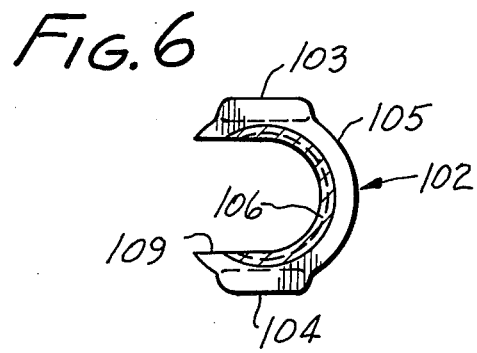

TWO LIQUID HEAT EXCHANGE SYSTEM AND SAFETY VALVE TO PREVENT CONTAMINATION

FIELD OF THE INVENTION

This invention relates to heat exchange systems and especially to two liquid heat exchange systems, for example, systems in which a first liquid is heated and passed to a heat exchanger which transfers the heat to a second liquid that usually is stored in a storage tank.

BACKGROUND OF THE INVENTION

It is customary practice, especially in solar heating applications, to circulate a first liquid through a solar panel or boiler where it will be heated, and then to conduct the first liquid to a heat exchanger, usually disposed in a storage tank where the heat is transferred to a second liquid such as domestic water. A problem with such a system is that pollution of the domestic water supply by the heating liquid is not tolerable, and it is customary to require that there be a double wall separation between them so that if one wall fails, the other wall will still protect the domestic water supply. This is a complicated, expensive, and potentially inefficient technique.

It is an object of this invention to avoid this double wall construction by providing a safety valve which will dump the first liquid unless the pressure of the second liquid is sufficiently higher than the pressure of the first liquid so that as between the circuits, the first liquid cannot contaminate the second liquid.

BRIEF DESCRIPTION OF THE INVENTION

This invention includes conduitry which forms a first and a second circuit respectively conveying a first and a second liquid. The first liquid is passed through a boiler or other heat source and then to one side of a heat exchanger. The second liquid is passed to the other side of the heat exchanger. The heat exchanger is customarily disposed in a storage tank or in a conduit containing the second liquid. The system further includes a safety valve which is responsive to the pressure in each of the circuits and includes a valve which will dump the fluid in the first circuit unless the pressure in the second circuit is greater than that in the first circuit by at least a predetermined difference.

According to a preferred but optional feature of the invention, the first circuit includes a pressure relief vent valve which will vent the first circuit in the event of leakage of the heat exchanger, thereby to discharge fluid driven by the higher pressure of the second liquid.

According to another preferred but optional feature of the invention, the safety valve comprises a body having a pair of diaphragms which form three chambers, two of the chambers being respective to pressure in each of the fluid circuits and separated by the double wall arrangement of the two diaphragms. The diaphragms carry a valve operator which is biased so as to remain open unless the pressure in the second circuit is greater than the pressure in the first circuit by at least a predetermined difference.

The above and other features of this invention will be fully understood from the following detailed description and the accompanying drawings, in which:

BRIEF DESCRIPTION OF THE DRAWINGS

FIG. 1 is a schematic system diagram of the presently preferred system according to the invention;

FIG. 2 is an axial cross-section of the presently preferred embodiment of a safety valve used in the system of FIG. 1;

FIGS. 3 and 4 are cross-sections taken at lines 3—3 and 4—4, respectively, in FIG. 2;

FIG. 5 is a fragmentary plan view of another construction for a portion of the safety valve of FIG. 2; and FIG. 6 is a cross-section taken at line 6—6 in FIG. 5.

DETAILED DESCRIPTION OF THE INVENTION

In FIG. 1 there is shown a system 10 according to the invention which has as its object to provide a means for heating a liquid in a storage tank 11, which will then be provided to a point of use. The system shown is a hydronic solar device, which can be used for heating domestic hot water for a swimming pool, or for other domestic purposes.

A first circuit 15 for a first liquid includes a boiler 16. This may if desired be a gas or fuel fired boiler, or could instead be a solar panel, all heating devices being generically referred to as a "boiler". The boiler-heated contents are discharged through conduit 17 with the assistance of a pump 18. Its output passes through conduit 19 into heat exchanger 20. The heat exchanger discharges through conduit 20a to a check valve 21 which also acts as a pressure regulator and includes a vent 22 for discharging to a sewer or sump liquid from this circuit when it is above some predetermined maximum pressure.

From valve 21, conduit 23 returns the first liquid to the boiler. The first liquid could be water, or instead some liquid with a higher specific heat such as a brine. In any event, it is undesirable for the first liquid to enter the domestic water supply.

The first circuit comprises elements 15–23. It is filled from a source 25 such as a domestic water supply through an autofill regulator valve 26 that tends to keep the system filled and to prevent backflow into the domestic water supply. Such valves are usually started and set manually, and then maintain the pressure in the system within limits. In the event of upstream pressure drop, they become an anti-siphon valve and prevent backflow. In the event of a large downstream pressure drop, they shut off supply to the downstream circuit and vent it. These are conventional valves known to persons skilled in the art and do not require detailed description here.

The second circuit 30 is for storing and conveying a second liquid which might be such as domestic hot water for drinking, bathing or swimming. Water is supplied from conduit 31 to conduit 32, then to the storage tank, where it makes contact with the heat exchanger. Then it can be withdrawn through conduit 33, under control of valve 34. This invention does not require the inclusion of a water tank for storage. The invention can be carried out without storage provisions. It relates primarily to protecting two circuits which are on opposite sides of a heat exchanger. Locating the heat exchanger in a storage tank is merely a very advantageous use of the invention. However, the heat exchanger will be disposed in an "enclosure" of which an enlarged conduit or a storage tank are two examples, the enclosure serving to contain the liquid which does not flow through the heat exchanger.

The systems described to this point are conventional. It is common to require a double wall between the two circuits where they coincide. This is unnecessary in this invention because of the incorporation of a safety valve 35. This valve is best shown in FIGS. 2-4. Valve 35 includes a valve body 36 with an internal cavity 37. As can best be seen in FIG. 4, the cavity is generally circular and has a central axis 38. The body may conveniently be made in three parts 39,40,41 which can be held together by fasteners (not shown).

Between the parts there are disposed a first diaphragm 42 and a second diaphragm 43. These diaphragms extend across the cavity to form first, second, and third chambers 44,45,46, respectively.

A first liquid sensor port 48 passes through body part 39 and enters first chamber 44. A first liquid entry port 49 passes through body part 40 and enters second chamber 45. A first liquid drain port 50 passes through body part 40 and departs from second chamber 45. A second liquid sensor port 51 passes through body part 41 and enters third chamber 46.

A valve 55 is disposed in the second chamber. It includes a valve seat 56 on said axis. The seat is normal to the axis. Passage 57 extends from first liquid entry port 49 to this valve seat for flow therethrough. A valve closure 58 faces the valve seat and is axially moveable toward and against it, and away from it, as determined by the diaphragms. A rigid link 59 in the shape of a solid rod is mounted to the second diaphragm by a pair of nuts 60, 61 which are threaded to the link and against the diaphragm so as to adjust its position. The valve closure is threaded or otherwise rigidly attached to the rigid link so as to move with it. The first diaphragm is attached to the rigid link by nuts 62,63. Movement of the rigid link to the left or right in FIG. 2 will seat or unseat the valve closure to close or to open the valve.

The diaphragms are flexible, and in order to provide for the axial movement at their centers, may either be shaped with convolutions or may be made of material with sufficient elasticity to permit this movement. An example is a sheet rubber diaphragm.

A plate 64 bears against the first diaphragm in the first chamber, and supports one end of a bias means 65. Means 65 is a conventional compression spring. A second plate 65a is mounted to the end of an adjustment screw 66 which passes through the wall of part 39 so that rotation of the adjustment screw will adjust the compression of the bias means.

The rigid link includes a smooth section 67 which makes a fluid sealing fit in a hole 67a through the wall of conduit 57 by means of an O-ring seal 68. This section is of sufficient length as to permit the full necessary axial movement of plate 64 to open and close the valve.

A somewhat simpler means for a valve closure 100 is shown in FIGS. 5 and 6. Valve closure 100 is shown positioned relative to valve seat 56, the same as valve closure 58 is positioned in FIG. 2, and their functions are the same. However, the link does not pass through the conduit 57. Instead it passes around it, and therefore does not require an O-ring seal. Link 101 is attached to diaphragms 42 and 43. The link includes a fork 102 with arms 103, 104 that join to a split ring 105 with an internal, partial thread 106. The link includes a bolt 107 that supports the closure, and has a thread 108 which joins to thread 106. Split 109 in ring 106 provides access for conduit 57. This rigid link construction can be substituted directly for link 59, but of course hole 67a will not be used. It will be plugged if it exists.

In designing the safety valve, it is convenient for the two diaphragms to be identical, so that equal fluid pressures on them will exert equal axial forces on the rigid link. This is not a design limitation.

If desired, valved bleed ports can be provided through the wall of each chamber to bleed air from it. These are optional, because the air tends to bubble away or be dissolved in a working system.

The safety valve is plumbed into the system by means of a first liquid sensor conduit 70 which interconnects conduit 19 with the first liquid sensor port 48, a drain conduit 71 which connects conduit 19 with the first liquid entry port 49, and a second liquid sensor conduit 72 which connects conduit 31 with second liquid sensor port 51.

The operation of the safety valve and of the system is as follows. With the system drained and at rest, the bias means will be set to exert a preload on the diaphragms of some known and desired value. An example is a bias force which will simulate a 10 psi load on diaphragm 42. Under these conditions, the bias means will exert a force on the diaphragm system tending to move it to the right in FIG. 2. This will move the valve closure off the valve seat to open the valve to flow to and out of drain port 50. Unless and until there is sufficient pressure in the third chamber, obtained from the second fluid circuit to overcome this bias, the first liquid circuit cannot be filled because the safety valve drains it. The second circuit is therefore protected. When sufficient pressure is exerted in chamber 46 to overcome the bias, plus an additional small increment, the diaphragm system moves to the left in FIG. 2 and moves the closure to close the valve in the second chamber. Now the first circuit can be filled. It can be filled or remain filled, however, only so long as the differential between pressures in the first and third chambers is greater than the pressure which is simulated by the force exerted by the bias spring. If the differential (difference) falls below that, then the spring bias will cause the valve to open and dump liquid from the first circuit. This protects the second circuit from contamination. Domestic water is ordinarily supplied at pressures between 60 and 100 psig, and the first liquid circuit is usually maintained at about 15-30 psig.

With both systems filled and operating at their usual pressures, assume there is a leak or failure in the second circuit. Without the safety valve, then liquid from the first circuit might be able to flow into the domestic water supply, which is impermissible.

With the safety valve installed, the pressure in the system will drop and promptly be sensed in the safety valve. The third chamber pressure will drop abruptly, and the necessary differential to hold the safety valve closed will no longer exist. Then the spring bias will cause the closure to move off the seat and dump the contents of the first circuit. This will promptly reduce the pressure in the first circuit, thereby even more quickly overcoming any tendency to backflow into the domestic water supply. This condition will continue until the pressure in the second circuit can again exceed the pressure in the first circuit by the predetermined differential, usually after repairs are made.

In case the heat exchanger itself develops a leak under normal operating conditions, the higher pressure of the second circuit will enter the first circuit. Then the first circuit will be vented at vent 22, and first liquid cannot flow back into the second circuit.

This invention thereby provides a simple system which enables substantial savings of equipment and materials to be made, and also provides a two wall separation between the two systems which functions to protect one system from the other in case of leaks or of lack of sufficient pressure in the second circuit. However, the double walls are only required in a small valve, and are provided at a minor cost.

This invention, which is described for usage in a domestic water supply and with a boiler, is applicable to any system wherein there is a heat exchange between two liquids, and contamination of one system by the other is to be avoided. Therefore the illustrated application of the invention is not a limitation on this invention.

This invention is not to be limited by the embodiment shown in the drawings and described in the description which is given by way of example and not of limitation, but only in accordance with the scope of the appended claims.

I claim:

1. A two liquid heat exchanger system comprising a first liquid circuit comprising a boiler, a circulating pump, a heat exchanger, and conduitry to circulate a first liquid through them;
a second liquid circuit including an enclosure which encloses said heat exchanger, said enclosure having an inlet and an outlet for supplying second liquid under presssure to said enclosure and for removing it therefrom, said second circuit being adapted to be supplied with liquid under pressure; and
a safety valve comprising a valve body having a cavity therein, a first diaphragm and a second diaphragm, said diaphragms being spaced from one another, whereby to divide said cavity into a first, a second, and a third chamber, with the first diaphragm separating the first and second chambers, and with the second chamber between the first and third chambers, a first liquid sensor port passing through said body and entering said first chamber, a first liquid entry port and a first liquid drain port both passing through said body and entering said second chamber, a second liquid sensor port passing through said body and entering said third chamber, a valve seat in said second chamber, and a conduit interconnecting said first liquid entry port to said valve seat, whereby liquid entering said first liquid entry port can flow through said conduit and said valve seat into said second chamber, a valve closure in said second chamber facing said valve seat, a rigid link connected to both of said diaphragms, said valve closure being mounted to said rigid link, said diaphragms being flexible, whereby to enable said link to move said valve closure against said valve seat to close said conduit or to move it away from said valve seat to open said conduit, and bias means biasing said valve closure toward its said open condition, whereby said valve closure remains in said open condition unless and until the pressure in said third chamber exceeds the pressure in said first chamber by a difference sufficient to cause the net force generated on said diaphragms to overcome the force of said bias means and press said valve closure against said valve seat, said first circuit being connected to said first liquid sensor port and to said first liquid entry port, and said second circuit being connected to said second liquid sensor port.

2. A system according to claim 1 in which said bias means is adjustable to vary its bias force.

3. A system according to claim 1 in which the surface areas of said diaphragms are substantially equal.

4. A system according to claim 1 in which said first liquid circuit includes a unidirectional check valve downstream from said heat exchanger, said check valve including the function of venting said first liquid circuit when pressure therein exceeds a predetermined value.

5. A system according to claim 1 in which said first liquid circuit includes a unidirectional check valve downstream from said heat exchanger, said check valve including the function of venting said first liquid circuit when pressure therein exceeds a predetermined value.

6. A two liquid heat exchanger system comprising:
a first liquid circuit comprising a boiler, a circulating pump, a heat exchanger, and conduitry to circulate a first liquid through them;
a second liquid circuit including an enclosure which encloses said heat exchanger, said enclosure having an inlet and an outlet for supplying second liquid under pressure to said enclosure and for removing it therefrom, said second circuit being adapted to be supplied with liquid under pressure; and
a safety valve comprising a valve body having a cavity therein, a first diaphragm and a second diaphragm, said diaphragms being spaced from one another, whereby to divide said cavity into a first, a second, and a third chamber, with the first diaphragm separating the first and second chambers, and with the second chamber between the first and third chambers, a first liquid sensor port passing through said body and entering said first chamber, a drain port entering said second chamber, a second liquid sensor port passing through said body and entering said third chamber, a valve having a valve seat and a valve closure, said valve seat connected to a first liquid entry port, said valve closure having an open and a closed condition, a rigid link connected to both of said diaphragms and to said valve closure for moving said valve closure to its open or to its closed condition as a function of diaphragm position, and bias means biasing said valve closure toward its said open condition, whereby said valve closure remains in said open condition unless and until the pressure in said third chamber exceeds the pressure in said first chamber by a difference sufficient to cause the net force generated on said diaphragms to overcome the force of said bias means and press said valve closure against said valve seat, said first circuit being connected to said first liquid sensor port and to said first liquid entry port, and said second circuit being connected to said second liquid sensor port.

7. A system according to claim 6 in which said bias means is adjustable to vary its bias force.

8. A system according to claim 6 in which the surface areas of said diaphragms are substantially equal.

* * * * *